US006815848B1

(12) United States Patent
Glew

(10) Patent No.: US 6,815,848 B1
(45) Date of Patent: Nov. 9, 2004

(54) AIR COOLED ELECTRICAL MACHINE

(75) Inventor: Charles Neville Glew, Rugby (GB)

(73) Assignee: Alstom UK Ltd., Rugby (GB)

( * ) Notice: Subject to any disclaimer, the term of this patent is extended or adjusted under 35 U.S.C. 154(b) by 73 days.

(21) Appl. No.: 10/069,889

(22) PCT Filed: Sep. 1, 2000

(86) PCT No.: PCT/GB00/03375

§ 371 (c)(1),
(2), (4) Date: Jul. 3, 2002

(87) PCT Pub. No.: WO01/17094

PCT Pub. Date: Mar. 8, 2001

(30) Foreign Application Priority Data

Sep. 1, 1999 (GB) .............................................. 9920581

(51) Int. Cl.$^7$ ............................ H02K 3/24; H02K 9/00; H02K 9/16
(52) U.S. Cl. ............................ 310/52; 310/58; 310/59; 310/62; 310/60 A; 310/65; 310/258; 440/6
(58) Field of Search ............................. 310/52, 57, 58, 310/59, 60 R, 60 A, 65, 89, 258, 62; 440/6

(56) References Cited

U.S. PATENT DOCUMENTS

| 1,402,875 A | * | 1/1922 | McCallister | ................. 290/4 R |
| 1,687,542 A | * | 10/1928 | Carrier | ......................... 261/115 |
| 2,303,883 A | * | 12/1942 | Kent | ............................. 310/57 |
| 3,171,996 A | * | 3/1965 | Alger et al. | ................... 310/51 |
| 3,237,032 A | * | 2/1966 | Valentine et al. | .............. 310/57 |
| 3,461,330 A | * | 8/1969 | MacDougal | ................... 310/59 |
| 5,783,892 A | * | 7/1998 | Kanzaki et al. | .............. 310/258 |
| 6,583,526 B2 | * | 6/2003 | Griffith et al. | ................. 310/58 |

FOREIGN PATENT DOCUMENTS

| GB | 681077 | 10/1952 |
| GB | 1 252 192 | 11/1971 |
| GB | 2 338 350 A | 12/1999 |

* cited by examiner

Primary Examiner—Thanh Lam
Assistant Examiner—David W. Scheuermann
(74) Attorney, Agent, or Firm—Kirschstein, et al.

(57) ABSTRACT

An electrical machine has a stator, a rotor, and radially extending coolant passageways provided in a laminated core section of at least the stator. The coolant passageways are defined between axially spaced stacks of laminations in the laminated core section. The radial passageways are connected to coolant supply ducts through a gap between the stator and the rotor. More efficient cooling of the machine is obtained by providing a matrix of coolant duct sections extending circumferentially and axially of the core section. The matrix has first and second radially spaced apart faces respectively in fluid communication with the radially extending coolant passageways in the laminated core section and coolant exhaust ducts. Some of the coolant duct sections communicate directly with the coolant exhaust ducts through the second face of the matrix and some or all of the adjacent coolant duct sections are in fluid communication with each other transverse of the radial direction to transfer coolant in a predetermined path within the coolant duct matrix.

20 Claims, 4 Drawing Sheets

AIR COOLED ELECTRICAL MACHINE

This invention relates to improvements in cooling arrangements for rotating electrical machines. More particularly, the invention is concerned with the efficient cooling of such machines The term "rotating electrical machine" is intended to cover any form of apparatus having a rotating member which generates, converts, transforms or modifies electric power, inter alia, such machines will comprise motors, generators, synchronous condensers, synchronous converters, rotating amplifiers, phase modifiers and combinations of these in any one machine.

With increasing development of permanent magnets and the use of exotic materials in machines, it is now possible to produce relatively high power/high torque motors which occupy far less space than equivalent machines of, say, five years earlier. This reduction in size brings with it an increase in complexity in cooling the machines. Heat dissipation is also a problem with machines that do not employ permanent magnets. The more efficient the cooling, the higher the power density and hence smaller the machine that can be produced.

In a normal arrangement, it is known to provide a laminated component which forms a part of the stator of the machine. This is typically formed from stacks of sheets of electrical grade steel which are often provided with insulating coatings. Each sheet may, for example, be of generally disc or annular form.

Between stacks of the sheets are often provided passageways for cooling fluid, e.g. air, which passageways extend substantially radially. More particularly, in a typical machine the radial inner or outer ends of the passageways will adjoin with the air gap between the rotor and stator. Our published patent document GB 2 338 350 A discusses how to define such passageways more advantageously in terms of the cooling effect they can produce.

Whilst such an arrangement allows the passage of cooling fluid from the inside to the outside (or from the outside to the inside) of the rotor or stator, it has been found that the cooling effect that is provided is insufficiently controlled to produce even cooling over the entire circumferential and axial extent of the rotor or stator. In an electrical rotating machine even cooling is essential in order to avoid localised overheating of windings, thus enabling increased power densities to be obtained.

It is an object of the present invention to provide an arrangement whereby a more controlled cooling of the machine can be achieved.

Accordingly, the invention provides an electrical machine comprising a stator and a rotor, with a gap defined between the stator and the rotor, the machine further comprising;

coolant supply duct means and coolant exhaust duct means, a plurality of substantially radially extending coolant passageways provided in a laminated core section of at least one of the stator and the rotor, the coolant passageways being defined between axially spaced stacks of laminations in the laminated core section, the radial passageways being connected to the coolant supply duct means via the gap between the stator and thd rotor, and a matrix of coolant duct sections extending circumferentially and axially of the laminated core Section, a plurality of adjacent coolant duct sections being in fluid communication with each other transverse of the radial direction to transfer coolant in predetermined paths within the coolant duct matrix, the matrix having first and second radially spaced apart faces, the first face being in fluid communication with the radially extending coolant passageways in the laminated core section, characterised in that the second face is in fluid communication with the coolant exhaust duct means, such that selected of the coolant duct sections communicate directly with the coolant exhaust duct means through the second face of the matrix.

In one possible arrangement of the machine, the first and second radially spaced apart faces of the matrix of coolant duct sections comprises its radially inner and outer faces respectively.

The matrix of coolant duct sections is conveniently defined between a plurality of annular side walls which extend radially and circumferentially of the laminated core section and a plurality of end walls which extend radially and axially of the laminated_core section, To facilitate the transfer of coolant in the predetermined path within the coolant duct matrix, apertures are provided in selected of the side walls and end walls of the coolant duct sections. The size and number of the apertures are preferably selected to achieve desired axial and circumferential pressure differences within the matrix of coolant duct sections. It is possible that each side wall and each end wall will have a respective aperture, but this will be determined by detailed design using computational flow analysis.

In a preferred embodiment of the invention in which the coolant duct sections are defined as above, a side wall at each axial end of the matrix constitutes an end plate of the laminated core section.

The end walls may be equi-angularly spaced around the laminated core section.

Preferably, each coolant duct section communicates directly with a plurality of the radially extending coolant passageways through the first face of the matrix.

Advantageously, the coolant supply duct means may define a coolant supply path directed towards an axial end of the laminated core section through a plenum chamber axially adjacent the laminated core section, the gap between the rotor and the stator communicating with the plenum chamber to provide a coolant flow path from the plenum chamber to the radially extending coolant passageways in the laminated core section. From a practical design point of view, it is preferable if the coolant supply duct means defines coolant supply paths directed towards both axial ends of the laminated core section through respective plenum chambers.

It is particularly advantageous for cooling end windings of the laminated core section if apertures in at least one of the end plates of the laminated core section provide a coolant flow path from the plenum chamber to selected of the coolant duct sections in the matrix, since the coolant can flow past the end windings on the way to the matrix.

The invention particularly facilitates designs in which at least one of the coolant supply duct means and the coolant exhaust duct means extends radially of the machine. This is useful where access to the machine is confined to certain angular positions around the machine.

The plurality of substantially radially extending coolant passageways provided in the laminated core section preferably comprise axially thin annular ducts. In accordance with our published patent document GB 2,338,350 A, the axially thin annular ducts can be defined by spacer means provided between adjacent confronting stacks of laminations in the laminated core section. The spacer means may thus comprise a pattern of mutually spaced apart axially projecting generally cylindrical members attached to at least one of the confronting laminations, the pattern extending between radially inner and outer peripheries of the confronting laminations. The pattern of generally cylindrical members may extend throughout the total annular extent of the passageway.

It should be noted that the matrix of coolant duct sections preferably extends around the entire circumference of the laminated core section.

It is convenient for layout of radially extending exhaust ducts if the coolant duct sections which communicate directly with the exhaust duct means comprise approximately half the circumferential extent of the matrix.

The invention further provides an electrical machine as described above, comprising a propulsion unit for a ship in which the machine is located within a bulbous portion extending from a hull of the ship, the rotor of the machine being located on a propeller shaft which extends outside the bulbous portion for propulsion of the ship, the coolant supply duct means and the coolant exhaust duct means being arranged within the bulbous portion to supply and exhaust coolant through the ship's hull.

It will be understood that by radially extending coolant passageways provided in the laminated core section, we mean passageways along which fluid can move from a first radial position to a second radial position. This may be from the innermost to outermost perimeter of the stator or rotor, or vice-versa. During such movement in radial passageways designed in accordance with our prior published patent document GB 2,338,350 A, it is envisaged that a substantial circumferential movement will also occur, due to the relative rotation between the rotor and stator, but primarily due to the influence of the circumferential pressure differences developed within the matrix of cooling duct sections. The fluid may even have a greater circumferential velocity than radial velocity on moving through such radial passageways.

By providing a circumferential matrix of coolant duct sections around the laminated core of the rotor or stator it is possible to control the passage of fluid through the machine to optimise cooling of the rotor and/or stator in a predetermined manner. This is achieved at the design stage by computational design by varying the size of the openings between each adjacent duct section, thus allowing the cooling flows in the radial passageways to be optimised with respect to the losses in each duct section.

The openings in the walls of the duct sections, e.g., between adjacent duct sections or between the duct sections and the exhaust duct means, may be laser cut into the material. Of course, other cutting methods may be employed.

It will be appreciated that the coolant duct sections do not need to be fabricated from solid plates of material. Other fabrication techniques are envisaged within the scope of the present invention, for example, a honeycomb sandwich or expanded metal construction could be used to produce the dividing walls.

In a preferred arrangement, the machine includes a stator extending around the outside of a rotor, the stator having radial passageways and the matrix of coolant duct sections extending around the outside of the stator. In an alternative arrangement, the matrix may extend around the inside of the rotor with the rotor having radial cooling passageways and rotating within the stator. In yet a further arrangement, the rotor may rotate around the stator with the matrix being provided around the outside of the rotor.

The matrix of cooling duct sections may comprise an integral part of the laminated core section of the machine. It may alternatively form a sleeve which is adapted to be secured around the circumference of the laminated core section. This may or may not be removable in use.

The combination of the arrangement of the radial passageways and their cylindrical members and the apertures in the walls between the duct sections is preferably chosen to maintain a substantially uniform temperature throughout the machine during normal operation.

The provision of the duct sections and their interconnecting holes ensures that the cooling fluid can travel a significant circumferential distance between entering the machine and leaving the machine. This enables the coolant for the machine to be supplied and exhausted from any desired circumferential location on the machine ration.

There will now be described, by way of example only, embodiments of the present invention with reference to the accompanying drawings, in which.

Figure 1:
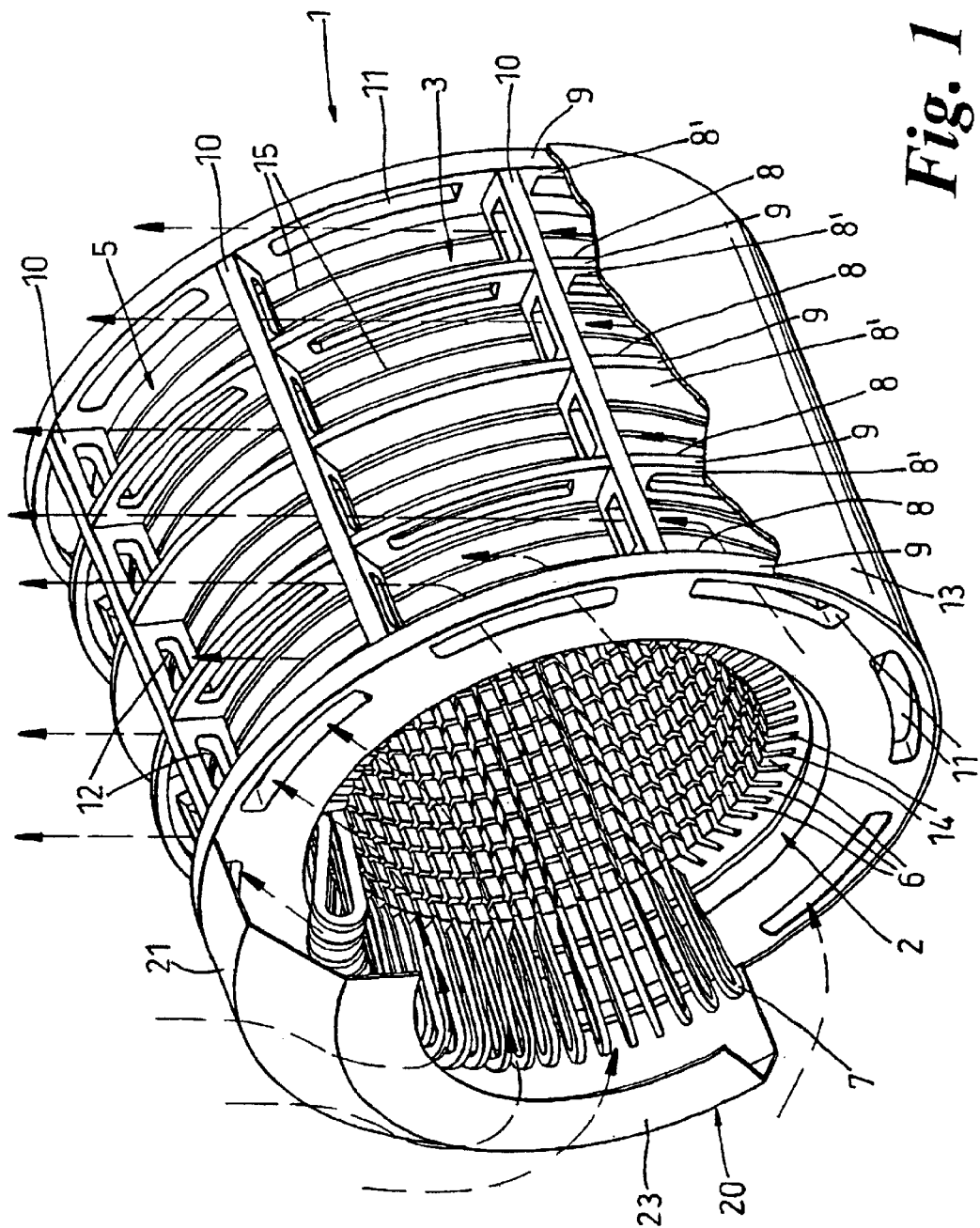
FIG. 1 is an isometric view in partial cross-section of a rotating electrical machine in accordance with one aspect of the present invention.
Figure 2:
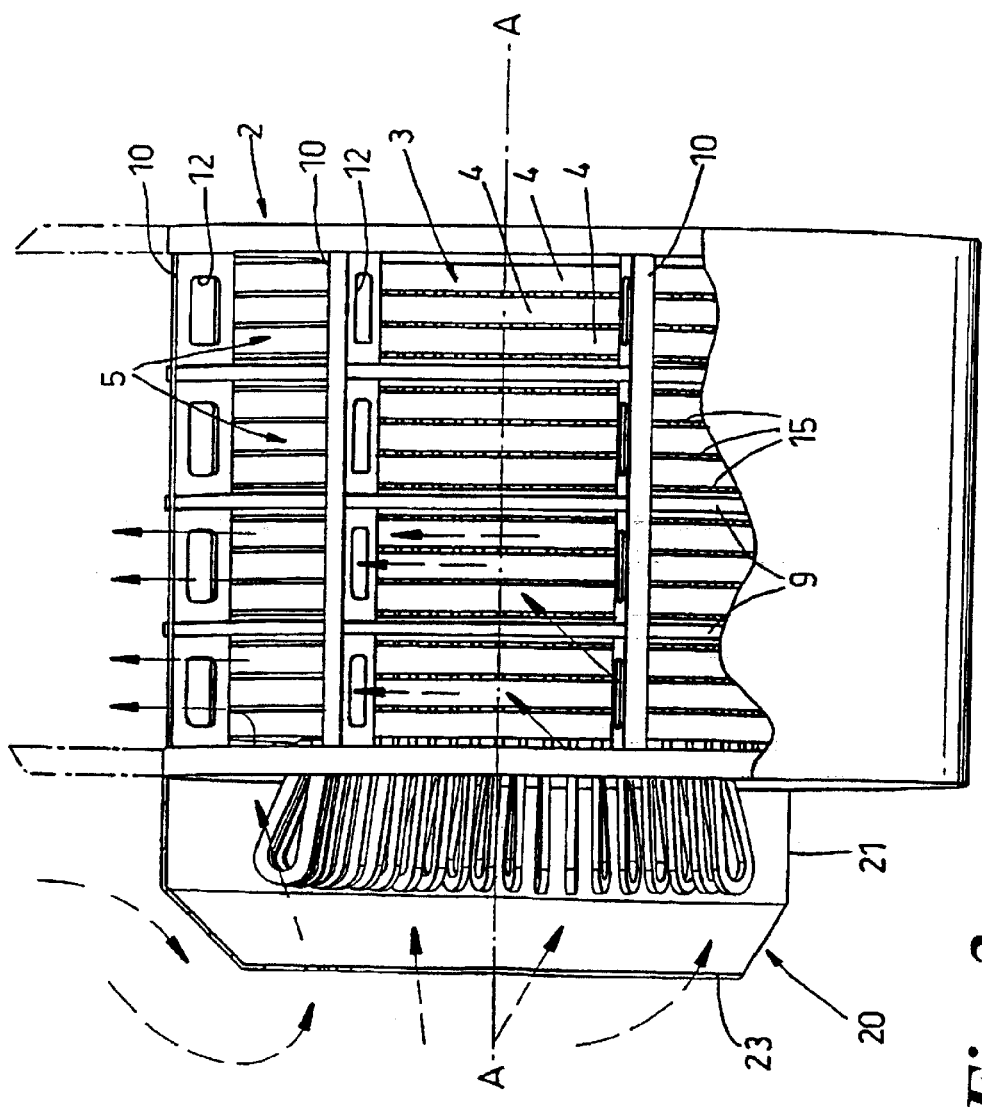
FIG. 2 is a side view of the machine of FIG. 1, again shown partially cut-away.
Figure 3:
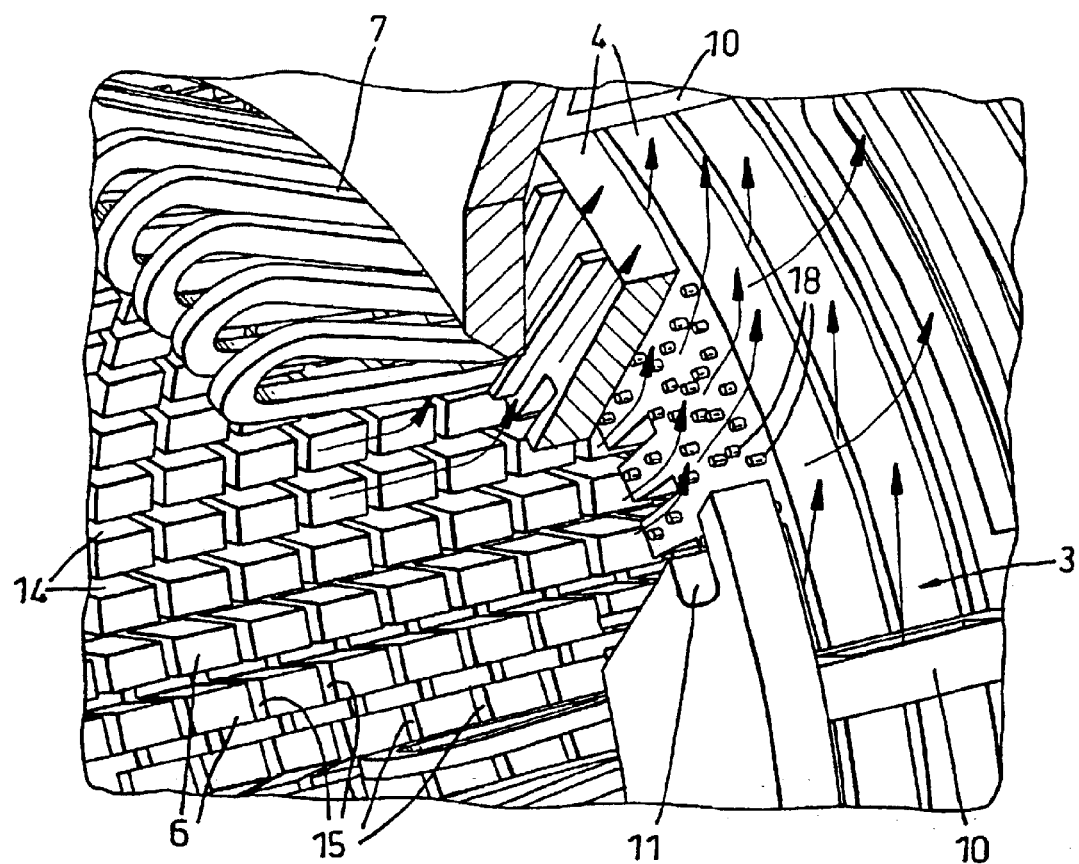
FIG. 3 is an enlarged cut-away view of the machine of FIG. 1 showing the location of cylindrical members within radial passageways of the stator.

As shown in FIGS. 1 to 3 of the accompanying drawings, the machine 1 comprises a rotor (not shown) which is adapted to rotate within an annular stator assembly 2. The rotor has a rotational axis A-A (FIG. 2), coinciding with the longitudinal axis of the stator. In alternatives, the machine may comprise a rotor which rotates around the outside of an annular stator.

The stator assembly 2 comprises an inner laminated core section 3 comprised of a plurality of axially spaced annular stacks 4 of laminations of electrical steel. This is surrounded by an outer matrix of coolant duct sections 5 having walls 9, $9^1$ and 10, fabricated from plates or sheets of material.

Each lamination of the stator comprises a thin, generally annular sheet member, with the inner circumference of each lamination, and therefore each stack 4 of laminations, being provided with generally radially inwardly extending teeth 6. Each pair of adjacent teeth 6 define therebetween a slot 14 to hold one or more windings 7 of the stator. For clarity of illustration, only the looped ends of some of the windings 7 are shown projecting from the slots 14, the rest of the length of the windings being omitted. It should be noted that certain designs of machine, e.g., superconducting machines, may not have the windings located in slots.

The stacks 4 of laminations as shown in FIG. 3 are separated by spacers in the form of cylindrical members 18 affixed to a face of an end lamination of each stack 4, as described in more detail in our prior patent specification GB 2 338 350 A. Thus, radially extending cooling passageways 15 in the form of axially thin annular ducts are defined between adjacent stacks with the cylindrical members 18 occupying the passageways with the axes of the members extending transversely across the passageways 15, e.g., substantially parallel to the axis A-A of the stator 2.

Around the outside periphery of the stator inner laminated core section is provided the circumferentially and axially extending matrix of coolant duct sections 5. The matrix can be characterised as having first and second radially spaced apart faces; the first or radially inner face of the matrix interfaces with the laminated core section 3 so that the matrix is in communication with the radial passageways 15, and the second or radially outer face of the matrix interfaces with a casing 13, through which it communicates with exhaust ducts, as explained later.

Within the matrix, each duct section 5 has side walls defined by confronting faces 8, $8^1$ of axially spaced apart annular plates 9 or $9^1$ of e.g., mild steel which lie in radial planes perpendicular to the stator axis A-A. In the illustrated embodiment, five such annular plates are provided, the two end plates $9^1$ being of greater thickness than the others to function as load bearing end plates for the stator. The spacing between the side walls 8, $8^1$ in this embodiment is such as to embrace four radial passageways 15, but the number of passageways so embraced could be more or less at the option of the designer, taking into account the volume of the coolant flows required to be managed by the duct sections 5 for any particular machine.

The circumferentially extending duct sections 5 defined between confronting side walls 8, $8^1$ are further defined by radially and axially extending end walls 10, which have a radial depth equal to that of the annular side wall plates $9^1$ and an axial width equal to the spacing between the side walls 8, $8^1$. The end walls in the present embodiment are equi-angularly spaced apart around the core section 3. The side walls 9 and $9^1$ and end walls 10 are fixed together, e.g., by welding, to form a rigid matrix of coolant duct sections 5 which extends circumferentially and axially around the stator. In the particular embodiment shown, eight radial end walls 10 are provided, so defining a total of thirty two circumferential duct sections 5 in the matrix.

As shown, a respective elongate opening 11 is provided in each side wall 9, $9^1$ of the ducts 5, as well as an opening 12 in each of the end walls 10. The "tops" of the coolant duct sections 5, which together constitute the before-mentioned radially outer face of the matrix, are covered by a surrounding casing 13 which is shown cut-away; however, at least some of the duct sections on the upper half of the stator are only partly covered by casing 13, or even completely uncovered, apertures (not shown) being provided in the casing 13 as appropriate, so that these partially or completely uncovered duct sections connect to ducting 26 shown in FIG. 4 for exhaustion of the used cooling air from the stator, as further explained below. In this embodiment, the "bottoms" of all the duct sections 5—which together constitute the radially inner face of the matrix which interfaces with the laminated core section —are left open for free fluid connection to the radial passageways 15 between the stacks 4 of core laminations.

An annular end cap 20 is shown as provided on one end of the stator, though it is preferably provided at both ends, as explained later. It has an axially and circumferentially extending peripheral wall 21 fixed at the outer circumference of the end plate $9^1$ of the stator and joined by a frusto-conical portion to a radially extending inwardly directed end wall 23 distal from the stator. The radial wall 23 defines a central circular hole for supply of coolant to the machine and to allow the rotor to be mounted on a shaft. The end cap 20, in conjunction with the ends of the rotor and stator, defines a plenum chamber for the supply of coolant to the machine.

In operation, coolant such as air, as indicated by the dashed arrows, is pumped axially into the centre of the stator through the plenum chamber defined by the end cap 20. From there, it flows through the stator by two different routes. By one route it flows between the end windings 7 to cool them and then through the openings 11 in the end wall $9^1$ of the stator into the adjacent duct sections 5. By the other route it flows into the air gap between the rotor and stator. From the air gap it enters the radial passageways 15 defined in the inner laminated core section 3 of the machine. Coolant then flows through the radial passageways 15, past the cylindrical members 18, and outwards into the matrix of duct sections 5. Once the coolant has reached the matrix, it can also flow from one duct section 5 to its axially or circumferentially adjacent duct section 5 through the openings 11, 12 in the duct walls 9, 10. From the duct sections 5 in the upper half of the stator's circumference, the coolant can flow into the exhaust ducts 26 (FIG. 4) through uncovered or partially covered peripheries of the duct sections.

By careful design of the size of the openings 11,12 in the walls 9, $9^1$ and 10 of the duct sections, as well as the spacing and size of adjacent duct sections, accurate control of the cooling of the stator can be achieved to ensure a predetermined efficient cooling pattern is maintained. This accuracy of control has been found to be considerably more refined than a design in which the coolant duct matrix is omitted.

Although FIGS. 1 to 3 show openings in each end wall and side wall, not all the walls necessarily need openings. In this manner, by omitting or restricting selected of the openings 11, 12, and also by covering or (optionally partially) uncovering selected of the duct sections 5 on the upper half of the stator, a predetermined route which air can take around the stator can be defined. For example, those duct sections 5 in the upper part of the machine which are uncovered, or only partly covered, so as to communicate with exhaust ducts, will have a lower coolant pressure than the duct sections in the lower part of the machine which are fully covered by the casing 13. This circumferential pressure difference within the coolant duct matrix, which is controlled to a desired value or range of values by means of adjusting (during design of the machine) the sizes of the holes 12, will induce a circumferential component of velocity to the flows of coolant in the duct sections in the lower part of the machine, and also within the radial passages 15. In the latter connection, it should be noted that the movement of the rotor relative to the stator imparts a circumferential component to the coolant flow in the gap between rotor and stator. This circumferential component is transferred to the radial passageways 15 and may either assist or hinder the imparting of circumferential velocity components by the duct sections 5, as explained above.

It will also now be evident to the specialist that by selecting the sizes of the holes 11 in the side walls 9 of the duct sections, axial pressure differences within the cooling duct matrix can be created as desired, thereby to transfer coolant between axially adjacent duct sections, as deemed appropriate by the designer to achieve optimum coolant flows through the machine.

Figure 4:
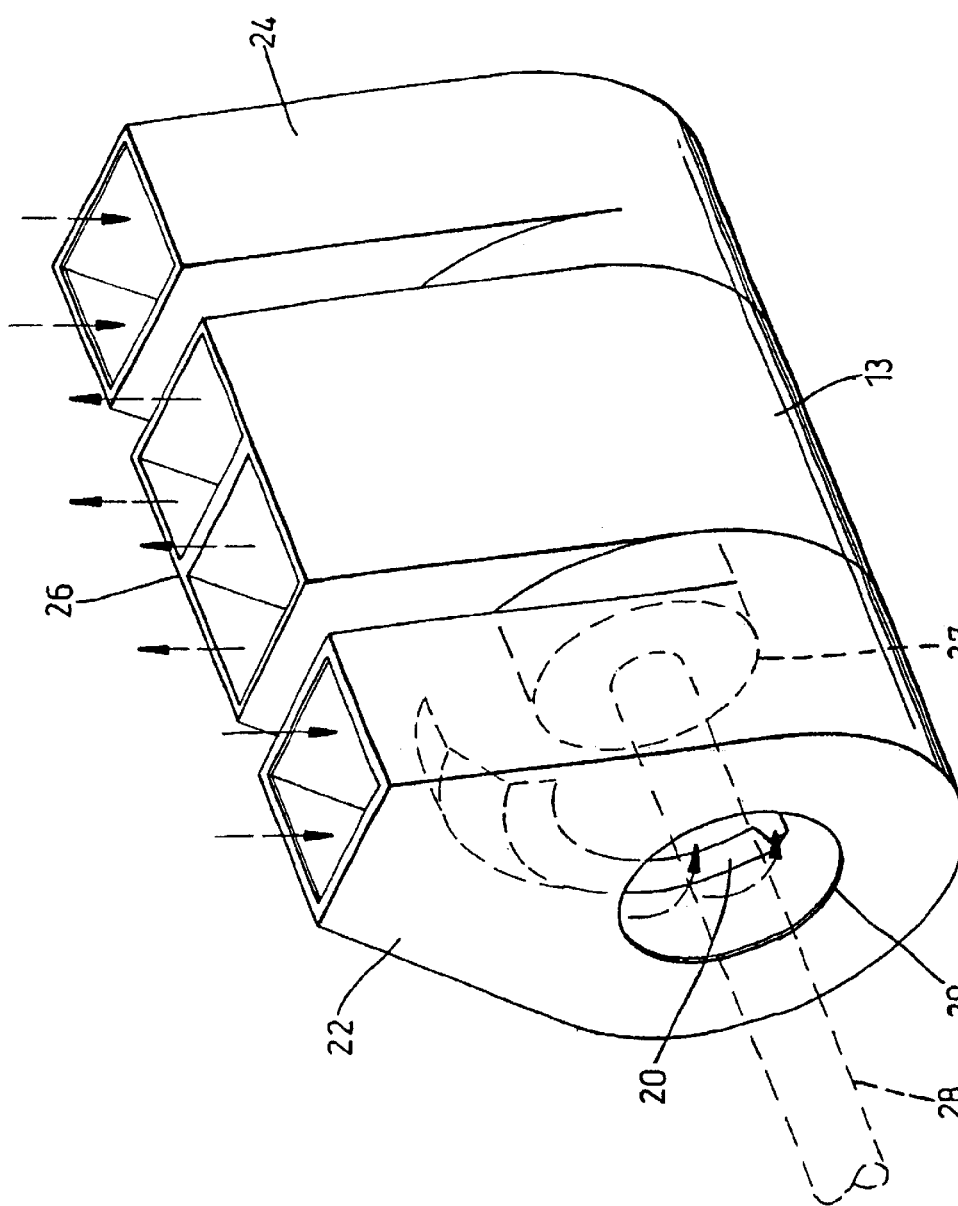
FIG. 4 is an isometric view illustrating one possible form of ducting and casing surrounding the machine of FIGS. 1 to 3, whereby cooling air may be supplied to and exhausted from the machine.

Referring now in particular to FIG. 4, there is shown a scheme for housing a machine having a stator like that described above and for supplying and exhausting coolant, preferably air, to and from duct sections at the top of the machine. Air is supplied through ducts 22 and 24 to both ends of the machine and hence each end is provided with an end cap 20, one end cap being shown in partial cut-away view within supply duct 22. The end caps ensure the coolant is supplied axially to the stator and rotor end windings and to the air gap between the rotor and stator. After passing through the stator in the manner already described, the coolant passes out of partially or completely uncovered duct sections in the top half of the stator into the twin exhaust ducts 26, as previously discussed.

The layout shown is particularly suited to a propulsion unit for a high power ship. The casing 13 may be located within a bulbous portion extending from the hull of the ship (not shown) and the propulsion unit may comprise the stator described in relation to FIGS. 1 to 3, together with a rotor 27 located within the stator on a tubular propeller shaft 28, these components being indicated in partial view by dashed lines. The tubular shaft 28 extends out of casing 13 through a hole 29 and connects to a propeller (not shown) outside the bulbous portion whereby rotation of the rotor 27 produces propulsion of the ship. If desired, the propulsion unit may be located eccentrically within the bulbous portion closer to the bottom of the bulbous portion, with ducts 22, 24, 26 being arranged within the bulbous portion to supply and exhaust coolant through the ship's hull.

The effect of the coolant duct sections 5 in imparting a significant circumferential component of velocity to the coolant flow as explained above, ensures that the coolant can travel through a significant angular distance between entering the machine and leaving the machine, thus enabling the coolant to be supplied to and exhausted from any convenient angular position on the machine. Hence, alternative modes of supplying and exhausting the coolant to and from the machine can be envisaged, e.g., for a rolling mill drive or mine-winder motor, in which the coolant supply and exhaust ducts could connect to the matrix of coolant duct sections at the bottom or sides of the machine. The exact configuration will depend upon the available space surrounding the machine. It will therefore be realised that whereas FIG. 4 shows the supply ducts 22, 24 and the exhaust ducts 26 arranged in an "in-line" configuration, they could occupy different angular positions around the circumference of the machine.

Whilst the embodiment illustrated is of a stator of a motor it will be appreciated that the invention may also be applied to a generator or any other electrical rotating machine in which it is important to provide accurate controlled cooling of the components of the machine. The matrix of coolant duct sections may be located around the outside of the machine as shown, or in the case of a machine in which coolant flows inwardly from a peripheral location and is exhausted from a central part of the machine, the coolant duct matrix may extend around an inner circumference of the machine if required.

What is claimed is:

1. An electrical machine, comprising:
   a) a stator;
   b) a rotor;
   c) a gap defined between the stator and the rotor;
   d) coolant supply duct means;
   e) coolant exhaust duct means;
   f) a plurality of substantially radially extending coolant passageways provided in a laminated core section of at least one of the stator and the rotor, the coolant passageways being defined between axially spaced stacks of laminations in the laminated core section, the coolant passageways being connected to the coolant supply duct means through the gap between the stator and the rotor; and
   g) a matrix of coolant duct sections extending circumferentially and axially of the laminated core section, a plurality of adjacent coolant duct sections being in fluid communication with each other in a direction transverse of a radial direction to transfer coolant in predetermined paths within the matrix, the matrix having first and second radially spaced apart faces, the first face being in fluid communication with the radially extending coolant passageways in the laminated core section, the second face being in fluid communication with the coolant exhaust duct means, selected coolant duct sections communicating directly with the coolant exhaust duct means through the second face of the matrix.

2. The electrical machine according to claim 1, in which the first and second radially spaced apart faces of the matrix comprise radially inner and outer faces, respectively, of the matrix.

3. The electrical machine according to claim 1, in which the matrix is defined between a plurality of annular side walls which extend radially and circumferentially of the laminated core section and a plurality of end walls which extend radially and axially of the laminated core section.

4. The electrical machine according to claim 3, in which apertures are provided in selected side walls and end walls of the coolant duct sections to facilitate the transfer of coolant in the predetermined paths within the matrix.

5. The electrical machine according to claim 4, in which a size and a number of the apertures are selected to achieve desired axial and circumferential pressure differences within the matrix.

6. The electrical machine according to claim 4, in which each side wall and each end wall has a respective aperture.

7. The electrical machine according to claim 3, in which a side wall at each axial end of the matrix constitutes an end plate of the laminated core section.

8. The electrical machine according to claim 3, in which the end walls are equi-angularly spaced around the laminated core section.

9. The electrical machine according to claim 1, in which each coolant duct section communicates directly with the plurality of the radially extending coolant passageways through the first face of the matrix.

10. The electrical machine according to claim 1, in which the coolant supply duct means defines a coolant supply path directed towards an axial end of the laminated core section through a plenum chamber axially adjacent the laminated core section, and in which the gap between the rotor and the stator communicates with the plenum chamber to provide a coolant flow path from the plenum chamber to the radially extending coolant passageways in the laminated core section.

11. The electrical machine according to claim 10, in which the coolant supply duct means defines coolant supply paths directed towards both axial ends of the laminated core section through respective plenum chambers.

12. The electrical machine according to claim 11, in which end plates for the laminated core section are provided at axial ends of the matrix, and in which apertures in at least one of the end plates of the laminated core section provide a coolant flow path from the respective plenum chamber to selected coolant duct sections in the matrix.

13. The electrical machine according to claim 1, in which at least one of the coolant supply duct means and the coolant exhaust duct means extends radially of the machine.

14. The electrical machine according to claim 1, in which the plurality of substantially radially extending coolant passageways provided in the laminated core section comprises axially thin annular ducts.

15. The electrical machine according to claim 14, in which the axially thin annular ducts are defined by spacer means provided between adjacent confronting stacks of the laminations in the laminated core section.

16. The electrical machine according to claim 15, in which the spacer means comprise a pattern of mutually spaced apart, axially projecting, generally cylindrical members attached to at least one of the confronting laminations, the pattern extending between radially inner and outer peripheries of the confronting laminations.

17. The electrical machine according to claim 16, in which the pattern of generally cylindrical members extends throughout a total annular extent of the passageways.

18. The electrical machine according to claim 1, in which the matrix extends around an entire circumference of the laminated core section.

19. The electrical machine according to claim 1, in which the coolant duct sections which communicate directly with the coolant exhaust duct means comprise approximately half a circumferential extent of the matrix.

20. The electrical machine according to claim 1; and further comprising a propulsion unit for a ship, the rotor of the machine being located on a propeller shaft of the ship.

* * * * *